United States Patent Office 3,373,098
Patented Mar. 12, 1968

3,373,098
PHOTOCHEMICAL METHOD FOR THE PREPARATION OF SUBSTITUTED POLYHEDRAL BORANE ANIONS
Swiatoslaw Trofimenko, Philadelphia, Pa., assignor to E. I. du Pont de Nemours and Company, Wilmington, Del., a corporation of Delaware
No Drawing. Filed Jan. 10, 1964, Ser. No. 337,514
9 Claims. (Cl. 204—157.1)

This invention relates to, and has as its principal object provision of, a process for preparing substituted derivatives of polyhedral borane cage compounds.

New classes of boron compounds have been described recently [Knoth et al., J. Am. Chem. Soc., 84, 1056–7 (1962)] which have unusual physical and chemical properties. The compounds are acids and salts of the polyhedral borane cage anions $B_{10}H_{10}^{-2}$ and $B_{12}H_{12}^{-2}$. These anions, the decaborate and dodecaborate anions, undergo, without degradation, substitution reactions which are comparable in scope to the substitution reactions in organic aromatic chemistry. In these reactions one or more hydrogens bonded to boron are replaced by organic or inorganic substituents without change in the cage structure of the polyhedral borane anions.

A number of procedures are available for preparing such substituted decaborates and dodecaborates. The compounds may be prepared by direct substitution of hydrogen with the desired group, by modification of substituents present on the polyborate anion, or by replacement of such substituents. Modification or replacement reactions provide versatile routes for obtaining substituted products which are not easily obtained by direct substitution. The present invention is directed to a replacement reaction.

In the present invention substituted polyhedral borane compounds are obtained by irradiating with ultraviolet light a solution containing (a) a divalent polyhedral $B_{10}$ or $B_{12}$ anion having halogen bonded to boron, and (b) an anion which will replace the halogen in (a) to form a different polyhedral borane anion.

The divalent polyhedral borane anion reactant is a halogenated decaborate or dodecaborate of the generic structural formula $$[B_mH_{m-n}(Hal.)_n]^{-2} \quad (1)$$

where $m$ is 10 or 12; $n$ is a positive whole number of 1 to $m$, inclusive; and (Hal.) represents a halogen (fluorine, chlorine, bromine and iodine). The structure for the halogenated decaborate anions can be viewed as $$[B_{10}H_{10-n'}(Hal.)_{n'}]^{-2} \quad (1a)$$

where $n'$ is 1–10, inclusive, while the structure for the halogenated dodecaborate anions can be viewed as $$[B_{12}H_{12-n''}(Hal.)_{n''}]^{-2} \quad (1b)$$

where $n''$ is 1–12, inclusive. The preparation of halogenated anions of Formulas 1, 1a and 1b is described fully in copending U.S. patent applications by Walter H. Knoth, Jr., Ser. No. 237,392, filed Nov. 13, 1962 and by H. C. Miller and E. L. Muetterties, Ser. No. 246,636, filed Dec. 21, 1962.

The second anion, i.e., the anion in the reaction which replaces the halogen in the polyhedral borane is conveniently represented as $A^{-v}$ where $v$ is the valence of the anion. Preferably, the numerical value of $v$ is 1 but it may have a value of 2. When a divalent anion is employed in the process, one valence may be viewed as bonding initially to one boron cage unit to form a monovalent anion which then bonds to a second boron cage unit. In the process of the invention, one or more of the halogens in the halogenated decaborate or dodecaborate are replaced by one or more substituents which are derived from the anion, $A^{-v}$. For convenience, this anion will be referred to hereinafter as A.

The anionic component A is present in compounds which are generally well known and readily available. It is preferable, although not essential, to employ an anion which is stable under the conditions of the process, i.e., A should be resistant to decomposition by ultraviolet light. Anions which are commonly classed as inorganic are generally resistant to degradation in the process and inorganic anions (A) are a preferred class of reactants. A preferred group of inorganic anions (A) are chloride, bromide, fluoride, iodide, nitrate, sulfate, azide, cyanide, isocyanate, cyanate, thiocyanate, and the like.

Anions which are derived from alcohols, phenols, mercaptans, carboxylic acids, sulfonic acids, and the like, generally perform well in the process and anions derivable from this class (RO⁻, RS⁻, RC(O)O⁻, and RSO₂O⁻, where R is an organic group) are a second preferred group of reactants. R is the above formulas preferably is an aliphatically saturated hydrocarbon group of at most 18 carbons, i.e., R is free of ethylenic and acetylenic bonds but may contain aromatic unsaturation, and most preferably lower alkyl or phenyl. The following anions are illustrative of this preferred group:

$C_6H_5^-$, $C_{10}H_7O^-$, $C_2H_5O^-$, $C_4H_9O^-$, $C_6H_{13}O^-$ $C_{18}H_{37}O^-$, $C_6H_{11}O^-$, $C_6H_{11}$—$C_6H_{10}O^-$, $C_6H_5$—$C_6H_4O^-$ $C_6H_5CH_2CH_2O^-$, $C_6H_5S^-$, $CH_3C_6H_4S^-$, $C_{12}H_{25}S^-$ $C_6H_5C(O)O^-$, $C_{11}H_{23}C(O)O^-$, $C_{18}H_{37}C(O)O^-$ $C_6H_5SO_2O^-$, $CH_3C_6H_4SO_2O^-$ and the like.

A further preferred group of anion reactants (A) are carbanions, e.g., cyanocarbon anions, acetylides, and the like which are illustrated later. Preferably, the carbanions are acetylides of the formula R—C≡C⊖ where R is aliphatically saturated hydrocarbyl of up to 16 carbon atoms, i.e., a hydrocarbon free of olefinic and acetylenic unsaturation.

The polyhedral borane substituted anion which is the product of the reaction of the invention may be viewed as having the following structure:

$$[B_mH_{m-(p+s)}(Hal.)_pA'_s]^{-2} \quad (2)$$

where (Hal.) and $m$ are defined as in Formula 1; A' represents the substituent derived from the anion A; $p$ is a cardinal whole number equal to $(m-s)$, $s$ is a positive whole number of 1 to $m$, inclusive. The sum of $(p+s)$, therefore, lies between 1 and the value for $m$, inclusive.

In the operation of the process the anions will, of course, be supplied by compounds in which th anions are associated with cations. These cations do not take part in the exchange reaction and their nature and composition are not critical. For convenience, the reactants which supply the halogenated decaborate and dodecaborate anions may be represented by the formula $$M_a[B_mH_{m-n}(Hal.)_n]_b \quad (3)$$

where $m$, $n$ and (Hal.) are defined as in Formula 1; M is a cation, i.e., an element or group of elements capable of forming a positively charged ion in aqueous solution; and $a$ and $b$ are the smallest whole numbers which satisfy the equation $$b = \frac{a \times \text{valence of M}}{2}$$

Reactants which supply the anion A may be represented by the formula $$M'_yA_z \quad (4)$$

where M' is a cation as defined for M in Formula 3, A is an anion other than a halide of (Hal.) in (1), and y and $z$ are positive whole numbers whose values are determined by the valences of M′ and A, and are the smallest whole numbers which satisfy the well known equation as follows:

$$\frac{\text{valence of M}'}{z} = \frac{\text{valence of A}}{y}$$

The anion which is a product of the reaction can be isolated by combination with any appropriate cation and the product as isolated can be represented by the formula $$M''_a[B_mH_{m-(p+s)}(\text{Hal.})_pA'_s]_b \quad (5)$$

where M″ is a cation as defined for M in formula 3, $a$ and $b$ are defined as in Formula 3, $m$, $p$, $s$, A′ and (Hal.) are defined as in Formula 2.

As noted earlier, the cations designated as M, M′, M″ in Formulas 3, 4 and 5 do not take part in the exchange reaction. The sole function of these groups is to provide the necessary cations which will combine with the anions and provide a compound which can be handled and isolated. The cations, M and M′ in the reactants of Formulas 3 and 4, preferably are stable under the conditions of the reaction although stability is not an essential characteristic. The cation, M″, in the final product is not necessarily present during operation of the process but it may be supplied in a final isolation step. The cations, M, M′ and M″ can be alike or different. The process, as generally conducted, employs solutions of the compounds and, for this reason, compounds of Formulas 3 and 4 are employed which have good solubility in the liquid medium. Compounds in which M and M′ are of small ionic volume generally show good solubility and form a preferred class.

The cations M, M′ and M″ represent a broad range of elements and combinations of elements. For example, the cations can be hydrogen, hydronium ($H_3O^+$), a metal, ammonium ($NH_4$), hydrazonium ($NH_2NH_3^+$), N-substituted ammonium, N-substituted hydrazonium, sulfonium, phosphonium, metal-ammine, pyridinium, N-substituted pyridinium and the like. To illustrate more specifically, M, M′, M″ can be lithium, sodium, cesium, barium, vanadium, iron, cobalt, copper, zinc, aluminum, thallium, tin, lead, bismuth, silver or any other metal. As further more specific illustrations M, M′ and M″ can be $RNH_3^+$, $R_2NH_2^+$, $R_3NH^+$, $R_4N^+$, $RNHNH_3^+$, $R_2NNH_3^+$, $R_3S^+$ or $R_4P^+$ where R is an organic group bonded to nitrogen, sulfur or phosphorus and is preferably an aliphatically saturated hydrocarbon group of at most 18 carbons. The cations can be Werner-type coordination complexes, e.g., a metal-ammine such as $[Ni(NH_3)_6]^{+2}$, $$[Zn(NH_3)_6]^{+2}$$

$[Co(NH_2C_2H_4NH_2)_3]^{+2}$, $[Co(NH_3)_6]^{+3}$ and the like. Specific illustrations of substituted ammonium and hydrazinium cations are $(C_2H_5)_2NH_2^+$, $(C_3H_7)_4N^+$, $$CH_3NHNH_3^+$$

$(C_2H_5)_2NNH_3^+$, $C_6H_5NHNH_3^+$ and similar groups. These examples are by way of illustration of types and classes and they are not limiting.

Alkali metal (Li, Na, K, Rb and Cs) and ammonium ($NH_4$) salts are readily prepared and are preferred reactants of Formulas 3 and 4.

The reaction is conducted in the presence of actinic radiation of the type generaly referred to as ultraviolet light. The term "ultraviolet light" is commonly understood to mean light of wavelengths less than 4000 A., the lower limit of wavelength being determined in specific cases by the transmission characteristics of the materials through which the light must pass. The lower limit is usually in the range of 1800–2000 A. Although light of any wavelength between about 1800 and 4000 A. can be employed in the present process, wavelengths of 2500–3700 A. are preferred since they are readily produced and provide sufficient energy for the desired reaction.

Any source of radiation may be used. Because of improved reaction efficiency sources relatively high in ultraviolet output are preferred. Generally speaking, mercury vapor arc lamps are used since they afford a relatively intense source of the preferred ultraviolet light. A wide variety of such lamps are available commercially, including both low and high pressure lamps with various types of glass envelopes. The lamps most desirable for use in the process are those with quartz envelopes since these lamps permit the highest percentage of transmission of ultraviolet light.

It is desirable that the light source be as close as possible to the reactants. This may be accomplished, for example, by placing the lamp immediately adjacent to a transparent wall of the reaction vessel or in a suitable well projecting into the reaction space. This lamp is made of quartz in the form of a helix which fits closely around the reaction vessel.

The temperature and pressure of the reaction mixture during the operation of the process are not critical. A reaction temperature between about −80° C. and about 200° C. is usually employed. A reaction temperature which lies between about −40° and 150° C. is preferred.

The pressure employed can be atmospheric or it can be above or below atmospheric. Pressures above or below atmospheric are employed solely as a matter of convenience in the operation of the process. For simplicity of operation, the reaction is preferably carried out at substantially atmospehric pressure or at pressures no greater than about 5 atmospheres.

The reaction is conveniently conducted in a batch process. The reaction can, however, be conducted by a continuous process wherein the reactants are circulated and recirculated through the reaction zone with intermittent removal of the desired chloride and recirculation of the unreacted materials.

The reaction may be and frequently is conducted in the presence of an inert solvent, i.e., a liquid in which the compounds of Formulas 3 and 4 will dissolve without reaction. The solvent may react with the anion obtained initially in the exchange reaction with the result that the anion of Formula 2 which is isolated as a compound of Formula 5 bears a substituent A′ which differs from the anion A in the reactant of Formula 4. For example, with water as a solvent, the substituent derived initially from the anion A may hydrolyze, rearrange or release one or more elements and thus lead to a product wherein the substituent A′ differs in composition from A. Such changes in structure may be advantageous by providing routes for the preparation and isolation of substituted decarborates and dodecaborates which are difficult to prepare by other more conventional methods.

The reaction proceeds satisfactorily in water and this solvent is preferred for convenience and economy. Other solvents which may be employed include aqueous solutions of ethers (e.g., 1,2-dimethoxyethane, and the like) and aqueous solutions of alcohols (e.g., ethanol, and the like). Other operable solvents are anhydrous lower fatty acids, dialkyl sulfoxides, N,N-dialkylamides, N-alkyl-2-pyrrolidones, and the like. Examples of solvents are glacial acetic acid, dimethyl sulfoxide, N,N-dimethylacetamide, and N-methyl-2-pyrrolidone.

The reaction unit is a quartz cylinder which has a length about four times the diameter and which, if desired, is connected to a reflux condenser. A low pressure quartz lamp (consuming about 10 watts at 100 volts) is fitted closely in the form of a helix around the quartz cylinder. The cylinder is charged with a solution of the reactants and it is then irradiated at atmospheric pressure for the desired time. The reaction mixture generally becomes warm, and cooling by appropriate means may be employed if desired, but it is not essential. In the examples which are given later to illustrate the process, cooling is not employed.

Separation of the desired reaction products is accomplished by conventional and well known methods. The reaction products are generally stable crystalline compounds. In one procedure, the irradiated reaction mixture is evaporated partially and an inorganic salt having a cation of large ionic volume [e.g., $(CH_3)_4N^+$, $Cs^+$, $Tl^+$, and the like] is added to precipitate the substituted decaborate or dodecarborate. In a second procedure, an aqueous solution of the crude reaction product is contacted with an acid ion-exchange resin and the acidic effluent is neutralized with a base having the desired cation. The neutralized solution is then concentrated until crystallization of the product occurs. The compounds can be purified further by recrystallization from appropriate solvents, e.g., water, water-acetonitrile, aqueous ethanol, ethers, esters, and the like. The compounds are frequently obtained with solvent of crystallization.

The examples which follow illustrate the process of the invention. Examples A through C described the preparation of the representative decaborates and dodecaborates employed as reactants in Examples 1 and 2.

Example A (A) A reaction vessel having a capacity of about 365 g. of water is charged with 0.79 g. of decaborane (14), cooled in liquid nitrogen, and then evacuated to a pressure of 10 microns of mercury. Approximately 21 g. of dimethyl sulfide is condensed onto the decaborane in the reaction vessel. The reaction vessel is closed, allowed to warm to atmospheric temperature and stand for 4 days. During this time, 6.6 millimoles of hydrogen is evolved. The reaction vessel is opened and excess dimethyl sulfide is removed by distillation, leaving a practically quantitative yield of white solid residue of $B_{10}H_{12}[S(CH_3)_2]_2$. The compound is recrystallized from ethyl acetate and it melts at 122–124° C.

A quantity (8.5 g.) of $B_{10}H_{12}[S(CH_3)_2]_2$ is mixed with 50 ml. of liquid ammonia and stirred in a round-bottom reaction vessel for 1 hour with cooling to a temperature of about −50° C. At the end of 1 hour the reaction mixture is allowed to warm to atmospheric temperature with stirring and excess ammonia evaporates. The last traces of ammonia are removed by subjecting the residue to a high vacuum (0.01 mm. of mercury) at 25° C. The residue (5.6 g.) is virtually pure $(NH_4)_2B_{10}H_{10}$. The reaction is repeated to obtain a further quantity of $(NH_4)_2B_{10}H_{10}$ (B) A reaction vessel, equipped with a stirrer, is charged with 120 ml. of water and 8.0 g. of $(NH_4)_2B_{10}H_{10}$. Vessel and contents are cooled to 10–15° C. and chlorine gas is passed through the aqueous solution until no rise in temperature above about 25° C. occurs when the vessel is removed from the cooling medium. At this point, chlorination is continued for 1 hour at about 25° C. A saturated solution of 21 g. of CsCl in water is added with stirring to the mixture and the white precipitate which forms is separated by filtration. The product is recrystallized from water to obtain 22 g. of $Cs_2B_{10}Cl_{10}$ as needle-like crystals.

Example B (A) A pressure vessel of 400 ml. capacity is charged with 9.5 g. of $NaBH_4$ and 75 ml. of 1,2-dimethoxyethane (glyme). The vessel is closed, cooled to −80° C. and evacuated to a pressure of about 0.001 mm. of mercury. Diborane (14.0 g.) is charged into the vessel which is then sealed and heated with agitation under autogenous pressure for 10 hours at 120° C. The reactor is cooled, the volatile products are released by venting and the contents of the tube are washed into a receiver with glyme. A suspension of a white solid in a yellow liquid is formed from which the solid is separated by filtration. The solid is dissolved in hot tetrahydrofuran, the solution is filtered, the hot filtrate is diluted with glyme and chilled to yield 14.0 g. of solvated $Na_2B_{12}H_{12}$ as long, glistening white needles. The compound is recrystallized from a large quantity of diethyl ether to obtain $Na_2B_{12}H_{12} \cdot H_2O$. The process is repeated to obtain a further quantity of the sodium salt.

A reaction vessel is charged with 120 ml. of water and 20 g. of $Na_2B_{12}H_{12} \cdot H_2O$. The solution is cooled in a mixture of ice and water and chlorine gas is bubbled through the solution until no further absorption of chlorine is evident. The solution is warmed to about 30° C. and passage of chlorine gas is continued until no further uptake of chlorine occurs. The reaction mixture and 50 g. of chlorine is now charged into a corrosion-resistant pressure vessel and the mixture is heated under autogenous pressure at 150° C. for 2 hours. The vessel is cooled, vented, and the reaction mixture is removed by washing with water. The cloudy solution is neutralized with $NH_4OH$ and filtered. An excess of an aqueous solution of $(CH_3)_4NCl$ is added to the filtrate and the precipitate which forms is separated to obtain $[(CH_3)_4N]_2B_{12}Cl_{12}$.

(B) A quantity of $[(CH_3)_4N]_2B_{12}Cl_{12}$ is dissolved in water and the aqueous solution is passed through a column packed with a commercial acidic ion-exchange resin, the acidic effluent is evaporated under reduced pressure at 25° C. to obtain, as a crystalline hygroscopic white solid, the acid $(H_3O)_2B_{12}Cl_{12} \cdot 6H_2O$. The acid containing more or less water of hydration can be obtained by varying the intensity and duration of drying.

(C) An aqueous solution of $Na_2B_{12}H_{12} \cdot H_2O$ is passed through a column filled with a commercial acid ion-exchange resin. The aqueous effluent is evaporated under reduced pressure at not over 45° C. to obtain the acid, $H_2B_{12}H_{12}$, as a white crystalline solvated product of the composition $(H_3O)_2B_{12}H_{12} \cdot 8H_2O$. A solution of 10 g. of this acid in 150 ml. of water is placed in a reaction vessel and liquid bromine is added dropwise with stirring. The temperature rises rapidly to 90–100° C. and the rate of addition of bromine is adjusted to maintain this temperature. After 59 g. of bromine is added, the rate of bromine uptake decreases sharply. An additional 20 g. of bromine is added and the mixture is held at 80–90° C. for 1 hour. The reaction mixture is concentrated to a small volume under reduced pressure. An aqueous solution of CsF is added and the precipitate which forms is separated. It is a mixture of $Cs_2B_{12}H_2Br_{10}$ and $Cs_2B_{12}H_4Br_8$. It is recrystallized from hot water to obtain $Cs_2B_{12}H_2Br_{10} \cdot 4H_2O$.

Example C

A solution is prepared containing 20 g. of a hydrate of $Na_2B_{12}H_{12}$, 100 ml. of water and 100 ml. of methanol. It is cooled to 5–15° C. and bromine is added dropwise with stirring. After 30 ml. is added, the bromine uptake decreases sharply and an additional 30 ml. of bromine is added in one portion. A fast stream of chlorine gas is passed into the solution. The temperature of the reaction mass rises to 50° C. during this step. The solution is placed in a vessel equipped with a water aspirator and the solution is evaporated until excess bromine and the hydrogen chloride and hydrogen bromide formed in the reaction are removed as shown by the absence of color due to chlorine or bromine. The solution is neutralized with $NH_4OH$ and it is divided into two portions.

One portion is passed through a column filled with an acid ion-exchange resin and the aqueous effluent is concentrated by evaporation to about one-third its original volume. The solution is neutralized carefully with $NH_4OH$ and evaporated to dryness to obtain $(NH_4)_2B_{12}Br_{12}$ in satisfactory purity.

To the second portion of the reaction mixture an aqueous solution of CsF is added with stirring. The precipitate which forms is separated and recrystallized from water to obtain $Cs_2B_{12}Br_{12}$.

Example 1

Two solutions, each consisting of 100 g. of $Cs_2B_{12}H_2Br_{10}$ and 113 g. of KCN in 1000 ml. of water are irradiated, one solution for 60 hours and the second solution for 120 hours. The irradiated solutions are acidified with hydrochloric acid and evaporated to dryness. The residues are dissolved in acetonitrile, filtered and the filtrates are evaporated to dryness. The residues are now dissolved in water, an aqueous solution of $(CH_3)_4NCl$ is added to each and the precipitates which form are separated, washed and dried to obtain 22 g. and 23.3 g. of products, respectively. The products are combined and recrystallized from aqueous acetonitrile to obtain two crops of crystals weighing 13 g. and 10.0 g., respectively. The crystals are mixtures of the bis(tetramethylammonium) salts of decaborates bearing 8 and 9 cyano groups.

*Analysis.*—Calc'd for $[(CH_3)_4N]_2B_{12}H_2Br_2(CN)_8$: C, 29.6; H, 4.02; B, 20.0; Br, 24.7; N, 21.6. Calc'd for $[(CH_3)_4N]_2B_{12}H_2Br(CN)_9$: C, 34.3; H, 4.38; B, 21.7; Br, 13.5; N, 25.9. Found for product: C, 32.1; H, 4.30; B, 21.1; Br, 19.1; N, 2.37.

Example 2

A solution consisting of 80 g. of $Cs_2B_{10}Cl_{10}$ and 160 g. of KCN in 900 ml. of water is irradiated for 90 hours. The irradiated solution is acidified with hydrochloric acid and evaporated to dryness. The residue is extracted thoroughly with methanol. The methanol extracts are evaporated to dryness, the residue is dissolved in water and the aqueous solution is passed through a column filled with a commercial acid ion-exchange resin. The acidic effluent is placed in a glass reaction vessel and chlorine gas is passed into it until no further absorption of chlorine occurs. An aqueous solution of CsF is added and the cesium salt which precipitates is separated by filtration. The solid is recrystallized from water to obtain 20 g. of $Cs_2B_{10}Cl_8(CN)_2$.

The filtrate from the cesium salt preparation is mixed with an aqueous solution of $(CH_3)_4NCl$ and the solid which precipitates is separated to obtain 10.5 g. of $$[(CH_3)_4N]_2B_{10}Cl_8(CN)_2$$

The salt is purified by recrystallization.

*Analysis.*—Calc'd for above salt: C, 20.3; H, 4.06; B, 18.2; Cl, 48.0; N, 9.47. Found: C, 20.3; H, 4.38; B, 18.1; Cl, 47.8; N, 8.66.

Example 3

A solution of 21.9 g. of $Cs_2B_{10}Cl_{10}$ and 32.9 g. of KCN in 275 ml. of water is irradiated for 30 hours. Following irradiation, an aqueous solution of $(CH_3)_4NCl$ is added to the solution and the tan solid which precipitates is separated. The product is crystallized from water to obtain 2.2 g. of a mixture consisting of about 60%

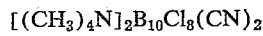

$$[(CH_3)_4N]_2B_{10}Cl_7(Cn)_3$$

and 40% $[(CH_3)_4N]_2B_{10}Cl_8(CN)_2$.

*Analysis.*—Calc'd for $[(CH_3)_4N]_2B_{10}Cl_{7.6}(CN)_{2.4}$: C, 21.2; H, 4.07; B, 18.3; Cl, 45.7; N, 10.5. Found: C, 21.4; H, 4.17; B, 18.7; Cl, 45.5; N, 10.5.

Example 4

A solution consisting of 2 g. of $(NH_4)_2B_{12}Br_{12}$ and 4 g. of NaF in 100 ml. of water is irradiated for 0.75 hour. The irradiated solution is concentrated and an aqueous solution of $(CH_3)_4NCl$ is added to it. The solid is separated, washed and purified to obtain a product containing about 5 fluorine atoms per molecule, i.e., a compound of the approximate formula $[(CH_3)_4N]_2B_{12}Br_7F_5$.

Passage of an aqueous solution of $[(CH_3)_4N]_2B_{12}Br_7F_5$ through a column filled with an acidic ion-exchange resin will yield an aqueous solution of $H_2B_{12}Br_7F_5$.

Example 5

A solution of 100 g. of a mixture of $Cs_2B_{12}H_2Br_{10}$ and $Cs_2B_{12}H_4Br_8$, and 100 g. of KCN in 1000 ml. of water is irradiated for 48 hours. The irradiated solution is acidified with hydrochloric acid and evaporated to dryness. The residue is extracted with methanol and the methanol extracts are evaporated to dryness. The residue is dissolved in water, an aqueous solution of $(CH_3)_4NCl$ is added and the precipitate which forms is separated. The solid is dissolved in acetonitrile and purified by chromatography, employing alumina in the column and acetonitrile as the eluting agent. The eluate is concentrated until crystals form, the first crop weighing 13.5 g. and the second crop 5.8 g. The crystals are combined and recrystallized from acetonitrile-water mixture to obtain 14.8 g. (27.3% yield) of $[(CH_3)_4N]_2B_{12}H_4Br_3(CN)_5$.

*Analysis.*—Calc'd for above formula: C, 23.4; H, 4.30; B, 20.0; Br, 36.8; N, 15.0. Found: C, 23.3; H, 4.45; B, 20.1; Br, 36.6; N, 14.8.

Example 6

(A) A solution of 25 g. of $Cs_2B_{12}H_2Br_{10}$ and 32 g. of KCN in 275 ml. of water is irradiated for 23 hours. An aqueous solution of $(CH_3)_4NCl$ is mixed with the dark irradiated solution and the precipitate which forms is separated. The product is crystallized from hot water to obtain 4.8 g. of $[(CH_3)_4N]_2B_{12}H_2Br_4(CN)_6$.

*Analysis.*—Calc'd for above formula: C, 22.2; H, 3.44; B, 17.2; N, 14.8; Br, 42.4. Found: C, 22.7; H, 3.21; B, 16.8; N, 15.0; Br, 43.8.

Example 7

A solution of 100 g. of $Cs_2B_{10}Cl_{10}$ and 113 g. of KCN in 1000 ml. of water is irradiated for 120 hours. The irradiated solution is cooled and crystals form. These are separated by filtration to obtain 27.2 g. of product which is a cesium salt of a substituted decaborate. An aqueous solution of $(CH_3)_4NCl$ is added to the filtrate and the tetramethylammonium substituted decaborate which precipitates is separated, washed and dried to obtain 64.0 g. of product.

A second solution of the above composition is irradiated 54 hours and processed as described earlier to obtain 35.6 g. of the cesium salt and 47.6 g. of the tetramethylammonium salt.

The tetramethylammonium salts from the three runs are combined into one batch and the cesium salts are combined in a second batch. Each batch is treated as now described below for the cesium salt.

The cesium salt is dissolved in water and the aqueous solution is passed through a column filled with an acid ion-exchange resin. The aqueous effluent contains the free substituted decaboric acid and chlorine gas is passed into it until the infrared absorption spectra shows no absorption bands due to B—H bonds. An aqueous solution of CsF is now added and the cesium salt which precipitates is separated, washed and dried. The cesium salt and 120 g. of KCN are dissolved in 1000 ml. of water and this solution is irradiated for 120 hours. An aqueous solution of $(CH_3)_4NCl$ is added to the irradiated solution and the precipitate which forms is separated. This product, which is a tetramethylammonium salt of a substituted decaborate, is purified by chromatography on alumina.

The tetramethylammonium salts obtained above (from the cesium batch and the tetramethylammonium batch) are combined, dissolved in water, converted to the free acid and chlorinated exhaustively again as described in the preceding paragraphs. The product is now isolated as the cesium salt. It is a mixture of the following salts: $Cs_2B_{10}Cl_9CN$, $Cs_2B_{10}Cl_8(CN)_2$ and $Cs_2B_{10}Cl_7(CN)_3$. Repeated recrystallization of the above salts permits isolation of $Cs_2B_{10}Cl_9CN$ in pure form.

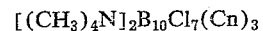

*Analysis.*—Calc'd for $Cs_2B_{10}Cl_9CN$: C, 1.67; B, 15.0; Cl, 44.3; N, 1.94. Found: C, 2.04; B, 14.9; Cl, 44.3; N, 1.65.

A portion of the mixed cesium salts are converted to the tetramethylammonium salts which are recrystallized repeatedly. A fraction is isolated which is a mixture of 30% of [(CH$_3$)$_4$N]$_2$B$_{10}$Cl$_8$(CN)$_2$ and 70% of

[(CH$_3$)$_4$N]$_2$B$_{10}$Cl$_7$(CN)$_3$

*Analysis.*—Calc'd for above product: C, 22.0; H, 4.12; B, 18.5; Cl, 44.3; N, 11.3. Found: C, 22.0; H, 4.51; B, 18.6; Cl, 44.1; N, 10.8.

Contacting aqueous solutions of the above salts, e.g., Cs$_2$B$_{10}$Cl$_9$CN and [(CH$_3$)$_4$N]$_2$B$_{10}$Cl$_7$(CN)$_3$ with an acidic ion-exchange resin will yield aqueous solutions of the acids, e.g., H$_2$B$_{10}$Cl$_9$CN and H$_2$B$_{10}$Cl$_7$(CN)$_3$.

*Example 8*

(A) An aqueous solution of 17 g. of hydrated

H$_2$B$_{12}$Cl$_{12}$ is neutralized with KOH and mixed with a solution of 32 g. of KCN in 275 ml. of water. The solution is irradiated for 44 hours. An aqueous solution of CsF is mixed with the clear yellow irradiated solution and the precipitate which forms is separated. The product is crystallized five times from water to obtain 4.0 g. of Cs$_2$B$_{12}$Cl$_5$(CN)$_7$

*Analysis.*—Calc'd for above salt: C, 11.1; B, 17.2; Cl, 23.5; Cs, 35.2; N, 13.0. Found: C, 11.1; B, 17.3; Cl, 24.1; Cs, 33.4; N, 12.8.

(B) The procedure of Part A is repeated employing 20 g. of H$_2$B$_{12}$Cl$_{12}$ containing 6.3 molecules of water of hydration and an irradiation period of 50 hours. The salt, Cs$_2$B$_{12}$Cl$_5$(CN)$_7$ is obtained in 69% yield.

(C) The mixture, as described in Part B, is irradiated for 64 hours. The cesium salt, Cs$_2$B$_{12}$Cl$_5$(CN)$_7$ is obtained in 75% yield (14 g.).

*Example 9*

(A) A solution consisting of 13.6 g. of Cs$_2$B$_{12}$Br$_{12}$ (0.01 mole) and 7.82 g. of KCN (0.12 mole) in 350 ml. of water is irradiated for 67 hours. Following irradiation the solution is evaporated to a volume of about 50 ml. and the solid which forms is separated by crystallization. The solid is dissolved in water and the solution is passed through a column filled with a commercial acid-ion-exchange resin of the crosslinked polystyrenesulfonic acid class. The acid eluate is neutralized with aqueous CsOH and the cesium salt precipitates. The cesium salt is recrystallized from water to obtain 2.3 g. of product which is a dicesium dodecaborate bearing bromine and cyano (CN) substituents bonded to boron.

The infrared spectrum of the compound shows characteristic absorption bands at the following wavelengths (expressed as cm.$^{-1}$); 1145, 1112, 984, 950, and 925.

The filtrate from the crude irradiated solution is mixed with an aqueous solution of tetramethylammonium chloride to obtain a bis(tetramethylammonium) dodecaborate bearing bromine and cyano substituents bonded to boron.

(B) A solution consisting of 13.6 g. of Cs$_2$B$_{12}$Br$_{12}$ and 15.6 g. of KCN in 300 ml. of water is irradiated for 44 hours at prevailing atmospheric temperature. The irradiated solution is concentrated by evaporation and crystals form on cooling. The crystals are separated by filtration and recrystallized from water to yield 2.5 g. of Cs$_2$B$_{12}$Br$_3$(CN)$_9$·H$_2$O. The identity of the compound is confirmed by elemental analysis.

*Analysis.*—Calc'd for Cs$_2$B$_{12}$Br$_3$(CN)$_9$·H$_2$O: B, 14.6; C, 12.1; H, 0.23; Cs, 29.9; Br, 27.0; N, 14.2. Found: B, 15.2; C, 13.4; H, 0.65; Cs, 29.6; Br, 26.5; N, 15.2.

An aqueous solution of tetramethylammonium chloride is added to the filtrate obtained from the crude mixture and [(CH$_3$)$_4$N]$_2$B$_{12}$Br$_3$(CN)$_9$ precipitates. It is separated and purified to obtain 1.25 g. of product.

(C) A solution of the composition described in Part B is irradiated for 48 hours. It is processed as described in Part B to obtain 2.7 g. of a hydrate of Cs$_2$B$_{12}$Br$_3$(CN)$_9$ and 1.25 g. of [(CH$_3$)$_4$N]$_2$B$_{12}$Br$_3$(CN)$_9$.

(D) A solution consisting of 13.6 g. of Cs$_2$B$_{12}$Br$_{12}$ and 31.2 g. of KCN in 300 ml. of water is irradiated for 90 hours. The irradiated solution is processed as described in Part A and 3.1 g. of Cs$_2$B$_{12}$Br$_3$(CN)$_9$ and 1.35 g. of [(CH$_3$)$_4$N]$_2$B$_{12}$Br$_3$(CN)$_9$ are obtained. The longer reaction time and higher concentration of KCN does not lead to improved yields of products.

(E) A solution consisting of 27 g. of Cs$_2$B$_{12}$Br$_{12}$ and 32.0 g. of KCN in 400 ml. of water is irradiated for 4 days. A second solution of the same composition is also irradiated for 4 days and the two solutions are combined and processed as described in Part A to obtain 22 g. of Cs$_2$B$_{12}$Br$_3$(CN)$_9$ and 5.2 g. of [(CH$_3$)$_4$N]$_2$B$_{12}$Br$_3$(CN)$_9$ as hydrated crystals.

(F) A solution consisting of 27 g. of Cs$_2$B$_{12}$Br$_{12}$ and 32.0 g. of KCN in 275 ml. of water is irradiated for 6 days. A second solution of the same composition is also irradiated for 6 days. The irradiated solutions are combined to form a clear solution to which an aqueous solution of CsF is added. The precipitate which forms is separated by filtration to obtain 21 g. of Cs$_2$B$_{12}$Br$_3$(CN)$_9$ as a hydrate. The filtrate from the irradiated solution is mixed with an aqueous solution of (CH$_3$)$_4$NCl to obtain [(CH$_3$)$_4$N]$_2$B$_{12}$Br$_3$(CN)$_9$.

The cesium salt is crystallized five times from water.

*Analysis.*—Calc'd for Cs$_2$B$_{12}$Br$_3$(CN)$_9$·H$_2$O: C, 12.1; H, 0.23; Cs, 29.9; B, 14.6; Br, 27.0; N, 14.2. Found: C, 12.2; H, 0.40; Cs, 29.0; B, 14.2; Br, 29.5; N, 14.2.

The ultraviolet spectrum of the above compound shows no maximum absorption in the 4000–2000 A. region. The B$^{11}$ nuclear magnetic resonance shows the presence of two types of boron atoms in the ratio of 9:3.

*Example 10*

A solution consisting of 13.6 g. of Cs$_2$B$_{12}$Br$_{12}$ and 23.4 g. of KCN in 300 ml. of water is irradiated for 48 hours at atmospheric temperature. Following irradiation, the solution is evaporated until crystals separate. It is filtered to obtain 4 g. of a hydrate of Cs$_2$B$_{12}$Br$_2$(CN)$_{10}$.

The filtrate from the irradiated solution is mixed with an aqueous solution of tetramethylammonium chloride to precipitate the tetramethylammonium substituted dodecaborate. The solid is separated and recrystallized twice from boiling water to obtain [(CH$_3$)$_4$N]$_2$B$_{12}$Br$_2$(CN)$_{10}$ as the monohydrate.

*Analysis.*—Calc'd for [(CH$_3$)$_4$N]$_2$B$_{12}$Br$_2$(CN)$_{10}$·H$_2$O: B, 18.2; C, 30.1; H. 3.64; Br, 22.4; N, 23.5. Found: B, 18.0; C. 29.7; H, 3.62; Br, 23.8; N, 23.3.

*Example 11*

A solution of 2.0 g. of Cs$_2$B$_1$Br$_3$(CN)$_9$, prepared as described in Example 9, and 5.0 g. of KCN in 100 ml. of water is irradiated for 64 hours. Following irradiation, an aqueous solution of (CH$_3$)$_4$NCl is added to the solution and the precipitate which forms is separated. The product is recrystallized from water to obtain

[(CH$_3$)$_4$N]$_2$B$_{12}$Br(CN)$_{11}$·H$_2$O

*Analysis.*—Calc'd for the above salt: C, 34.4; H, 3.93; B, 19.7; Br, 12.1; N, 27.5. Found: C, 34.0; H, 4.47; B, 18.7; Br, 14.2; N, 27.1.

*Example 12*

(A) A solution of Cs$_2$B$_{12}$Br$_{12}$ in water containing excess NaN$_3$ is irradiated for 2 hours and then for 3.5 hours more. At the end of each period the product, isolated as a tetramethylammonium salt, shows a strong azide (N$_3$) band at 2130 cm.$^{-1}$ in the infrared absorption spectrum.

(B) Two solutions, each consisting of 13.6 g. of Cs$_2$B$_{12}$Br$_{12}$ and 15.6 g. of sodium azide (NaN$_3$) in 270 ml. of water, are irradiated for 3.5 hours. The irradiated solutions are combined and an aqueous solution of (CH$_3$)$_4$NCl is added with stirring. The precipitate which forms is separated and the product is recrystallized from acetonitrile-water mixture to obtain [(CH$_3$)$_4$N]$_2$B$_{12}$Br$_{11}$N$_3$.

*Analysis.*—Calc'd for above salt: C, 8.19; H, 2.05; B, 11.1; Br, 75.1; Azide N, 3.59. Found: C, 8.31; H, 2.35; B, 10.9; Br, 74.2; Azide N, 3.74.

*Example 13*

(A) An aqueous solution containing 11.25 g. of $(NH_4)_2B_{12}Br_{12}$ (0.01 mole) and 23.4 g. of $NaN_3$ (0.36 mole) is irradiated for 1.5 hours. The irradiated solution is mixed with CsF and the cesium salt which precipitates is separated, washed and recrystallized to obtain 6.7 g. of $Cs_2B_{12}Br_{10}(N_3)_2$.

*Analysis.*—Calc'd for above formula: Br, 62.5; B, 10.2; N, 6.55. Found: Br, 62.4; B, 11.2; N, 5.55.

(B) An aqueous solution consisting of 20.0 g. of $(NH_4)_2B_{12}Br_{12}$ and 25 g. of $NaN_3$ in 270 ml. of water is irradiated for 2.5 hours. The irradiated solution is processed as described in previous examples to obtain 14.7 g. of $Cs_2B_{12}Br_{10}(N_3)_2$ and 4.0 g. of $$[(CH_3)_4N]_2B_{12}Br_{10}(N_3)_2$$

*Example 14*

A solution consisting of the 0.01 mole of $(NH_4)_2B_{12}Br_{12}$ and 0.36 mole of KOCN in 270 ml. of water is irradiated for 1.5 hours. The irradiated solution is concentrated and an aqueous solution of $(CH_3)_4NCl$ is added to precipitate the product. The solid is separated, washed, dried and recrystallized to obtain principally $$[(CH_3)_4N]_2B_{12}Br_{11}(OCN)$$

*Analysis.*—Calc'd for the above compound: C, 9.01; H, 2.00; B, 10.8; N, 3.50; Br, 73.3. Found: C, 9.36; H, 2.36; B, 10.9; N, 3.32; Br, 71.0.

*Example 15*

A solution consisting of 0.01 mole of $(NH_4)_2B_{12}Br_{12}$ and 0.36 mole of KOCN in 200 ml. of water is irradiated for 1.75 hours. The solution is processed as described earlier, employing $(CH_3)_4NCl$, and the compound which is isolated is a monohydrate of the formula $$[(CH_3)_4N]_2B_9(OCN)_2OH \cdot H_2O$$

where (OCN) represents the cyanate group.

*Analysis.*—Calc'd for the above formula: C, 10.7; H, 2.42; B, 11.6; Br, 64.5; N, 5.02. Found: C, 10.6; H, 2.24; B, 11.6; Br. 65.0; N, 4.52.

*Example 16*

A solution consisting of 100 g. $(NH_4)_2B_{12}Br_{12}$ and 230 g. of KOCN in 1000 ml. of water is irradiated for 85 minutes. The irradiated solution is allowed to stand for 2–3 days (weekend), after which an aqueous solution of $(CH_3)_4NCl$ is added to it. The precipitate which forms is separated and extracted twice with an acetonitrile-water mixture. There is obtained as a residue 27 g. of $[(CH_3)_4N]_2B_{12}Br_{10}(OH)_2$. The infrared absorption spectrum of the salt shows no bands in the —OCN region. In this instance, the —OCN group is converted to the —OH group in the process.

The above salt is converted to the free acid, $$H_2B_{12}Br_{10}(OH)_2$$

by contacting with an acidic ion-exchange resin. The aqueous solution of the acid is reacted with CsF to obtain $Cs_2B_{12}Br_{10}(OH)_2$.

*Analysis.*—Calc'd for $Cs_2B_{12}Br_{10}(OH)_2$: B, 10.5; Br, 64.8. Found: B, 10.5; Br, 64.3.

*Example 17*

(A) A solution of 20 g. of $Cs_2B_{12}Br_{12}$ and 30 g. of KSCN in 270 ml. of water is irradiated for 42 hours. An aqueous solution of CsF is added to the irradiated solution and the precipitate which forms is separated, washed and recrystallized to obtain 5.8 g. of $Cs_2B_{12}HBr_9(SH)_2$. A repeat run yielded 9.8 g. of the cesium salt. In this instance, the —SCN group is converted to the —SH group in the process.

*Analysis.*—Calc'd for above compound: B, 11.0; Br, 61.0; S, 5.43; H, 0.25. Found: B, 11.4; Br, 59.8; S, 5.86; H, 0.67.

Contacting an aqueous solution of $Cs_2B_{12}HBr_9(SH)_2$ with an acidic ion-exchange resin will yield an aqueous solution of $H_2B_{12}HBr_9(SH)_2$.

(B) A solution of 113 g. (0.1 mole) of $(NH_4)_2B_{12}Br_{12}$ and 233 g. of KSCN in 1 liter of water is irradiated for 91 hours. The irradiated solution is mixed with an aqueous solution of $(CH_3)_4NCl$ and the precipitate which forms is separated. The infrared spectrum of the product shows absorption bands at 2150 and 2050 cm.$^{-1}$. The product (108 g.) is dissolved in 209 ml. acetonitrile and the solution is heated to boiling. Water is added gradually until turbidity persists in the hot solution. The solution is cooled and the solid which precipitates is separated. It is washed with ethanol and dried to obtain 22 g. of product. The filtrate is mixed with 2 liters of water and the precipitate which forms is separated. It is dissolved in acetonitrile and the solution is chromatographed on alumina. The solution is processed to obtain a further quantity (54.5 g.) of the product. The elemental analysis and infrared absorption spectrum conform with a compound which is the hydrobromide adduct of $[(CH_3)_4N]_2B_{12}Br_{10}(SCN)SH$.

*Analysis.*—Calc'd for $[(CH_3)_4N]_2B_{12}Br_{10}(SCN)SH \cdot HBr$: C, 8.65; H, 2.08; B, 10.4; Br, 70.4; N, 3.36; S, 5.12. Found: C, 8.55; H, 2.38; B, 10.1; Br, 68.9; N, 3.12; S, 4.83.

*Example 18*

A solution consisting of 27.2 g. of $Cs_2B_{12}Br_{12}$ and 86.5 g. of $Na_2S \cdot 9H_2O$ in 350 ml. of water is irradiated for 97 hours. The solution which is orange-colored is mixed with an aqueous solution of $(CH_3)_4NCl$ and the precipitate which forms is separated to obtain 4.28 g. of crystalline solid. The solid is recrystallized from water to obtain, as a microcrystalline product $$[(CH_3)_4N]_4B_{12}H_5Br_6{-}S{-}B_{12}H_5Br_6$$

*Analysis.*—Calc'd for the above compound: C, 12.4; H, 3.72; B, 16.7; Br, 61.7; N, 3.60; S, 2.50. Found: C, 12.6; H, 4.08; B, 17.0; Br, 62.6; N, 3.81; S, 1.43.

In the process of Example 18, part of the bromine is replaced by hydrogen from the solvent and part by the sulfide anion. Two of the divalent $B_{12}$ anions are joined by the divalent "—S—" substituent obtained from the sulfide anion (A).

The process illustrated in Examples 1–18, inclusive, is generic from the preparation of polyborates bearing substituents derived from inorganic anions. To illustrate, irradiation of a salt of the $B_{12}Br_{12}^{-2}$ anion in the presence of a salt of anions such as Cl$^-$, I$^-$, $NO_3^-$, $SO_4^{-2}$, $NCO^-$, and the like will yield dodecaborate anions bearing substituents derived from the second anion, for example, salts of $$(B_{12}Br_{10}Cl_2)^{-2}, (B_{12}Br_9I_3)^{-2}, (B_{12}Br_{11}NO_3)^{-2},$$
$$(B_{12}Br_{11}OSO_3H)^{-2}, (B_{12}Br_{11}NCO)^{-2}$$

and the like. To illustrate further, irradiation of a salt of the $B_{10}Cl_{10}^{-2}$ anion with Br$^-$, F$^-$, I$^-$, NCO$^-$, $NO_3^-$, and the like will yield a salt of a decaborate anion bearing substituents derived from the second anion, for example, salts of $(B_{10}Cl_8Br_2)^{-2}$, $(B_{10}Cl_7F_3)^{-2}$, $(B_{10}Cl_8I_2)^{-2}$, $(B_{10}Cl_9NCO)^{-2}$, $(B_{10}Cl_9NO_3)^{-2}$, and the like. The process is generic for halogenated decaborates and dodecaborates in which the halogen is fluorine, chlorine, bromine or iodine.

*Example 19*

A solution of 11.6 g. of $(NH_4)_2B_{12}Br_{12}$, 22.5 g. of phenol and 13.5 g. of KOH in 270 ml. of water is irradiated for 26 hours. A brown suspension is obtained which is filtered. An aqueous solution of $(CH_3)_4NCl$ is added to the filtrate and the precipitate which forms is separated. It is recrystallized from water-acetonitrile mixture and then converted to the free acid by contacting it in aqueous solution with an acidic ion-exchange resin. The aqueous solution of the acid is reacted with CsF and the cesium salt which precipitates is separated and recrystallized from water to obtain a mixture of $Cs_2B_{12}Br_{12}$ and $Cs_2B_{12}Br_{11}(OC_6H_5)$ in which the two salts are present in about equal amounts.

*Analysis.*—Calc'd for $Cs_2B_{12}Br_{11.5}(OC_6H_5)_{0.5}$: C, 2.64; H, 0.18; B, 9.54; Br, 67.4. Found: C, 2.77; H, 0.80; B, 9.40; Br, 66.7.

*Example 20*

A solution consisting of 11.3 g. (0.01 mole) of $(NH_4)_2B_{12}Br_{12}$ and 35.3 g. (0.24 mole) of $$K[(NC)_2C=C(NH_2)O]$$

in 250 ml. of water is irradiated for 26 hours. The reaction mixture is processed as described in previous examples and the product is isolated as the tetramethylammonium salt. It is a mixture of approximately equal parts of $[(CH_3)_4N]_2B_{12}Br_{12}$ and $$[(CH_3)_4N]_2B_{12}Br_{11}OC(NH_2)=C(CN)_2$$

*Analysis.*—Calc'd for above mixture: B, 10.4; C, 9.59; H, 2.00; Br, 73.5; N, 3.92. Found: B, 10.2; C, 9.46; H, 2.22; Br, 73.5; N, 3.56.

The process illustrated in Examples 19 and 20 is generic for the preparation of polyborates bearing substituents derived for organic anions. To illustrate, irradiation of a salt of the $B_{12}H_2Br_{10}^{-2}$ anion in the presence of a salt of anions such as $C_4H_9O^-$, $$CH_3C_6H_4O^-, \ C_6H_5S^-, \ CH_3C(O)O^-, \ CH_3C_6H_4SO_3^-$$

will yield dodecaborate anion bearing substituents derived from the second anions, for example, salts of $$(B_{12}H_2Br_9OC_4H_9)^{-2}, \ (B_{12}H_2Br_9OC_6H_4CH_3)^{-2}$$
$$(B_{12}H_2Br_9SC_6H_5)^{-2}, \ [B_{12}H_2Br_9OC(O)CH_3]^{-2}$$
$$[B_{12}H_2Br_9OSO_2C_6H_4CH_3]^{-2}$$

and the like.

Polyborate anions bearing two or more unlike substituents are obtained in the process by irradiating the halogenated polyborate in two steps, employing different anions (A) in each step. To illustrate, a solution of the $B_{10}Br_{10}^{-2}$ anion is irradiated initially in the presence of the $CN^{-1}$ anion and then in the presence of the $N_3^{-}$ anion. Anions are obtained which bear the —CN and —$N_3$ groups in solution. The latter group is converted to —$NH_2$ in the process as illustrated in Example 21, for the $B_{12}Br_{12}^{-2}$ anion.

*Example 21*

A solution consisting of 11.4 g. (0.01 mole) of $Na_2B_{12}Br_{12}$ and 15 g. (0.23 mole) of KCN in 200 ml. of water is irradiated for 1 hour. The irradiated solution is processed as described in previous examples and the product is isolated as the dicesium salt. The salt (still wet) is stirred with 15 g. of $NaN_3$ and 200 ml. of water. The resulting solution is irradiated for 15 hours and no product is precipitated by addition of cesium ions or tetramethylammonium ions. An aqueous solution of $$[(C_3H_7)_4N]Cl$$

is added and a solid precipitates. The precipitate is separated and recrystallized from ethanol to obtain 0.04 g. of $$[(C_3H_7)_4N]_2B_{12}Br_3(CN)_5(NH_2)_4$$

as a white crystalline compound.

*Analysis.*—Calc'd for $C_{29}H_{64}B_{12}Br_3N_{11}$: C, 37.2; H, 6.84; B, 13.9; Br, 25.7; N, 16.5. Found: C, 38.4; H, 6.70; B, 14.3; Br, 26.0; N, 17.0.

As a further illustration, a solution of the $B_{12}Br_{12}^{-2}$ anion is irradiated in the presence of the $CN^{-1}$ anion and then in the presence of $OCN^{-1}$ anion to obtain a salt of a dodecaborate anion bearing —CN and —OCN groups, e.g., $Cs_2B_{12}Br_8(CN)_2(OCN)_2$. In the process some of the —OCN groups may be hydrolyzed to obtain a salt of a dodecaborate anion bearing —CN and —OH groups, e.g., $(NH_4)_2B_{12}Br_8(CN)_2(OH)_2$. Decaborates are equally operable.

The process of the invention can be employed to obtain halogenated polyborates bearing a plurality of halogens which are not alike. To illustrate, aqueous solutions containing the $B_{12}Cl_{12}^{-2}$ anion and the $Br^{-1}$ anion are irradiated as described in the examples and the anion $B_{12}Cl_{11}Br^{-2}$ is formed; $B_{10}Cl_{10}^{-2}$ yields $B_{10}Cl_9Br^{-2}$.

The process of the invention, as illustrated in the examples, is generically operable with a wide range of salts of polyhalogenated decaborates and dodecaborates. To illustrate, salts of the compounds of Formula 3 can be employed in which M is lithium, sodium, rubidium, calcium, barium, magnesium, strontium, aluminum, copper, silver, zinc, cadmium, lead, thallium, europium, cerium, methylammonium, diethylammonium, tricyclohexylammonium, hydrazinium, quinolinium, N,N-dimethylanilinium, pyridinium, piperidinium, triethylsulfonium, tetraphenylphosphonium, glycinium, tri($\beta$-hydroxyethyl)ammonium, benzyltrimethylammonium, and the like.

The process of the invention, as illustrated in the examples, is generically operable with a wide range of salts of anions of Formula 4 wherein M' can be of the broad scope illustrated above for M. To illustrate, salts of anions which are operable include $NH_4NO_3$, $NaHSO_4$, $$NaClO_3, \ CsF, \ LiI, \ Na_2Te, \ (CH_3)_4NOC(O)C_6H_5$$
$$NH_4OC(O)CH_3, \ NH_4OC(O)C_{11}H_{23}$$

$NaOC(O)CH_2CH_2(NH_2)CH_3$, $KOC(O)C_6H_4OC_6H_5$ and the like to obtain compounds of Formula 5 in which A' is —$NO_3$, —$HSO_4$, —$ClO_3$, —F, —I, —TE—, $OC(O)C_6H_5$, $$-OC(O)CH_3, \ -OC(O)C_{11}H_{23}$$

—$OC(O)CH_2CH_2(NH_2)CH_3$, —$OC(O)C_6H_4OC_6H_5$ and similar groups.

The process of the invention is operable particularly with carbanions and anions derived from cyanocarbons or other resonance stabilized organic molecules, e.g., from acetylenes ($HC\equiv C^-$ and $R'C\equiv C^-$) and from hydrocarbons ($R'^-$). Other representative anions which can be employed are $C(CN_3)^-$, $[C(CN)_2C(O)NH_2]^-$, $C(NO_2)_3^-$, $[CHC(O)OR']^-$, and the like. In the above formulas, R' can be a saturated or unsaturated hydrocarbon (alkyl, cycloalkyl, alkenyl, cycloalkenyl, aryl, and alkaryl), preferably of 1-6 carbon atoms. To illustrate, a solution of $B_{12}Br_{12}^{-2}$ irradiated in the presence of (1) $C_6H_5C\equiv C^{-1}$ yields a product bearing one or more $C_6H_5C\equiv C-$ groups, e.g., $B_{12}Br_{10}(C\equiv CC_6H_5)_2^{-2}$, (2) $C_4H_9^{-1}$ yields a product bearing one or more $C_4H_9$— groups, e.g., $B_{12}Br_{11}C_4H_9^{-2}$, (3) $(NC)_2CH^{-1}$ yields a product bearing one or more $(NC)_2CH-$ groups, e.g., $B_{12}Br_{11}[CH(CN)_2]$, and the like.

The process of the invention may be employed to obtain polymeric boron-containing products. To illustrate, an aqueous alkaline solution of $(NH_4)_2B_{12}Br_{12}$ and a hydroxyl-bearing polymer, e.g., polyvinyl alcohol, cellulose, etc., may be irradiated to obtain polymeric products having a carbon chain in which one or more carbons are bonded through oxygen to the anion $B_{12}Br_{11}^{-2}$, i.e., the product is a polymeric carbon chain bearing —$OB_{12}Br_{11}^{-2}$ groups.

The compounds obtained by the process of this invention are useful in many fields. The acids, alkali metal, alkaline earth metal, and ammonium salts are useful as sequestering agents for metals in aqueous media. Thus, copper, nickel, cobalt, zinc and cadmium are removed from aqueous solutions of salts containing these metals by mixing the solutions with ammoniacal salts of the acids, alkali metal, alkaline earth metal, and ammonium salts.

Substituted ammonium salts and, in general, nitrogen base salts as well as phosphonium and sulfonium salts, are useful in the field of sequestering agents to remove undesirable metals from aqueous or hydrocarbon media. To illustrate, a mixture of hydrocarbons in the boiling range of gasoline, which contains a copper salt of a fatty acid in solution may be agitated thoroughly with an aqueous ammoniacal solution of one of the aforementioned salts of the invention [e.g., $Cs_2B_{12}Br_{10}(OH)_2$, $Cs_2B_{10}Cl_9CN$ and the like]. Following this treatment, the mixture of hydrocarbons will be free of deleterious copper salts.

All of the compounds obtained by the process may be obtained as acids [i.e., compounds of Formula 3 in which M″ is hydrogen] by contacting solutions of the salts with an acid ion-exchange resin. The acids are strong acids and they are useful for etching metals, such as steel, and for rust removal, for pickling, for scale removal and for similar metal processing operations. Aqueous solutions of the acids are generically useful as agents for absorbing noxious basic materials from the air, e.g., traces of ammonia, lower alkyl amines, and the like. To illustrate, air contaminated with methylamines may be passed through an aqueous solution of $H_2B_{10}Cl_9CN$, $H_2B_{12}Br_7F_5$, $H_2B_{12}HBr_9(SH)_2$ and the like, and the amines will be removed.

The compounds obtained by the process are generically useful as components of high energy fuels and as components of compositions used in flares and other highly colored displays.

As many apparently widely different embodiments of this invention may be made without departing from the spirit and scope thereof, it is to be understood that this invention is not limited to the specific embodiments thereof except as defined in the appended claims.

The embodiments of the invention in which an exclusive property or privilege is claimed are defined as follows:

1. A process for preparing substituted polyhedral borane anions which comprises irradiating with ultraviolet light a solution containing a divalent polyhedral borane anion selected from the class consisting of $[B_{10}H_{10-n'}(Hal.)_{n'}]^{-2}$ and $[B_{12}H_{12-n''}(Hal.)_{n''}]^{-2}$ wherein $n'$ is a positive whole number from 1 to 10, inclusive, $n''$ is a positive whole number from 1 to 12, inclusive, and Hal. is a halogen, and an anion A, to form a polyhedral borane anion distinct from the anion irradiated.

2. The process of claim 1 wherein the anion A is a monovalent anion.

3. The process of claim 1 wherein the anion A is an inorganic anion of the class consisting of chloride, fluoride, bromide, iodide, nitrate, sulfate, azide, cyanide, isocyanate, cyanate, and thiocyanate.

4. The process of claim 1 wherein the anion A is an organic anion derived from a compound of the class consisting of alcohols, phenols, mercaptans, carboxylic acids and sulfonic acids wherein said anion is composed of, in addition to the functional group, hydrocarbyl of up to 18 carbon atoms free of aliphatic unsaturation.

5. The process of claim 1 wherein said divalent polyhedral borane ion is $B_{12}Cl_{12}^{-2}$, and A is cyanide.

6. The process of claim 1 wherein said divalent polyhedral borane ion is $B_{10}Cl_{10}^{-2}$ and A is cyanide.

7. The process of claim 1 wherein said divalent polyhedral borane ion is $B_{12}Br_{12}^{-2}$ and A is cyanide.

8. The process of claim 1 wherein said divalent polyhedral borane ion is $B_{12}Br_{12}^{-2}$ and A is cyanate.

9. The process of claim 1 wherein said divalent polyhedral borane ion is $B_{12}Br_{12}^{-2}$ and A is thiocyanate.

References Cited

UNITED STATES PATENTS 2,994,652  8/1961  Frazer et al. _____ 204—157.1

HOWARD S. WILLIAMS, *Primary Examiner.*

JOHN H. MACK, *Examiner.*